United States Patent
Bogusz et al.

(10) Patent No.: US 10,255,659 B2
(45) Date of Patent: Apr. 9, 2019

(54) METHOD OF AND APPARATUS FOR SCALING DATA ARRAYS

(71) Applicant: ARM Limited, Cambridge (GB)

(72) Inventors: Michal Bogusz, Cambridge (GB); Erik Persson, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/238,873

(22) Filed: Aug. 17, 2016

(65) Prior Publication Data

US 2017/0061577 A1 Mar. 2, 2017

(30) Foreign Application Priority Data

Aug. 28, 2015 (GB) .................................. 1515366.1

(51) Int. Cl.
*G06T 1/60* (2006.01)
*G06T 3/40* (2006.01)

(52) U.S. Cl.
CPC . *G06T 3/40* (2013.01); *G06T 1/60* (2013.01)

(58) Field of Classification Search
CPC ....................................................... G06T 3/40
USPC ....................................................... 345/660
See application file for complete search history.

(56) References Cited

U.S. PATENT DOCUMENTS

| | | |
|---|---|---|
| 2006/0012714 A1 | 1/2006 | Louie et al. |
| 2006/0126967 A1 | 6/2006 | Jen et al. |
| 2008/0122872 A1* | 5/2008 | Hsu ...................... G06T 3/4023 345/667 |
| 2008/0309817 A1 | 12/2008 | Huang et al. |
| 2016/0239941 A1* | 8/2016 | Lee .......................... G06T 1/20 |

OTHER PUBLICATIONS

Combined Search and Examination Report dated Jan. 11, 2016 in Great Britain Patent Application No. GB1515366.1.

* cited by examiner

*Primary Examiner* — Shivang I Patel
(74) *Attorney, Agent, or Firm* — Vierra Magen Marcus LLP

(57) ABSTRACT

A scaling apparatus for scaling data arrays, such as images, comprises first horizontal scaling stage circuitry operable to scale a data array input to the scaling apparatus in the horizontal direction, one or more line memories for storing horizontal lines for a data array, wherein the or each line memory is for storing a horizontal line of data for the data array, vertical scaling stage circuitry operable to read data stored in the one or more line memories and to scale the read data in the vertical direction, and second horizontal scaling stage circuitry operable to scale a data array in the horizontal direction.

19 Claims, 4 Drawing Sheets a) Horizontal scaler - vertical scaler architecture (HV architecture)

b) Vertical scaler - horizontal scaler architecture (VH architecture)

a) Horizontal scaler - vertical scaler architecture (HV architecture)

b) Vertical scaler - horizontal scaler architecture (VH architecture)

METHOD OF AND APPARATUS FOR SCALING DATA ARRAYS

BACKGROUND

The technology described herein relates to methods of and apparatus for scaling data arrays. In particular, the technology described herein relates to methods of and apparatus for scaling arrays of image data in a data processor.

A data array will comprise an array of data positions, with each data position having an associated data value or values, and have a given number of data positions in each dimension (e.g. in the horizontal and vertical directions) corresponding to the resolution of the array in each dimension. For example, an image may comprise a two-dimensional array of sampling positions (e.g. pixels), with each sampling position having an associated set of colour values (e.g. RGB or RGBα).

Scaling is performed on a data array to alter the horizontal and/or vertical size of the data array, for example to alter the resolution of an image. A number of different scaling methods are known including hardware methods. These methods differ in complexity, memory (RAM) requirements and their resultant image quality.

Some methods use only data from the sampling positions (e.g. pixels) of a single input line of the data array at a time to compute data for a single output sampling position, e.g. the nearest neighbour method. However, the image quality of the scaled image resulting from the output data array using such methods is generally poor.

More sophisticated methods use sampling positions from multiple input lines of the data array at a time to compute each output sampling position, e.g. a bilinear method uses sampling positions from two input lines at a time, a bicubic method uses sampling positions from four input lines at a time. The most frequently used method in present systems is polyphase filtering, which uses e.g. 6 or 8 input lines at a time depending on the number of taps used in the filter.

Scaling apparatus such as image scalers that are conventionally used in hardware solutions can have one of the two architectures shown in FIG. 1. Each architecture comprises two scaling stages—a horizontal scaling stage and a vertical scaling stage, each for performing appropriate scaling operations in the respective direction.

When a data array is to be scaled in the vertical scaling stage, each horizontal line of data is first written to a line memory, and is then processed as it is being read from the line memory. Thus, each of the two architectures shown in FIG. 1 requires one or more line memories for storing horizontal input lines of a data array to be processed in the vertical scaling stage. In order for a scaling apparatus to support horizontal scaling up to a maximum horizontal resolution of HS number of sampling points in the horizontal direction (e.g. HS number of pixels in the horizontal direction of an image), each line memory is required to be able to store an equivalent number of data entries corresponding to the maximum horizontal resolution, i.e. each line memory must be able to store HS number of data entries.

In the case of example (a), input image data is upscaled in the horizontal scaling stage to the maximum horizontal resolution HS. The horizontally upscaled image data is then written to the line memories, a predetermined number of horizontal lines at a time, to be read in the vertical scaling stage. In order for each line memory to accommodate a full horizontal line of the upscaled image data, each line memory must be able to store at least HS number of data entries. The number of horizontal lines to be read at a time depends on the vertical scaling method used. For example, if a 6-tap polyphase filtering method is used, then the vertical scaling stage requires 6 input lines at a time, and so 6 line memories are required.

In the case of example (b), the input image data is to be downscaled in the horizontal scaling stage from the maximum horizontal resolution HS. However, in order to support the vertical scaling stage, each line memory is again required to be able to store HS number of data entries for each input line of the data array to be read in the vertical scaling stage.

As shown in the examples in FIG. 1, in conventional image scalers, irrespective of their architecture, each line memory is always required to be able to handle a number of data entries equal to the number of sampling points corresponding to the maximum horizontal resolution supported by the image scaler.

It is desired to provide an improve method and apparatus for scaling data arrays.

BRIEF DESCRIPTION OF THE DRAWINGS

A number of the embodiments of the technology described herein will now be described by way of example only and with reference to the accompanying drawings, in which.

Like reference numerals are used for like features throughout the drawings, where appropriate.

DETAILED DESCRIPTION

Figure 1:
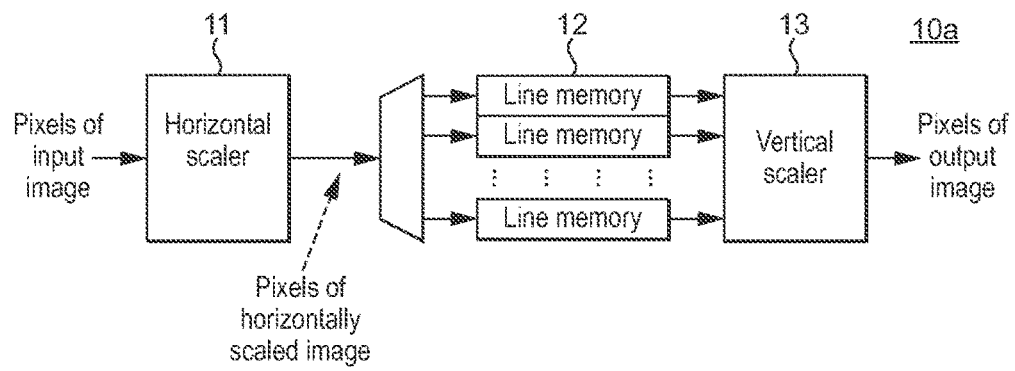
FIG. 1 shows two types of architecture used in conventional scaling apparatus.
Figure 1:
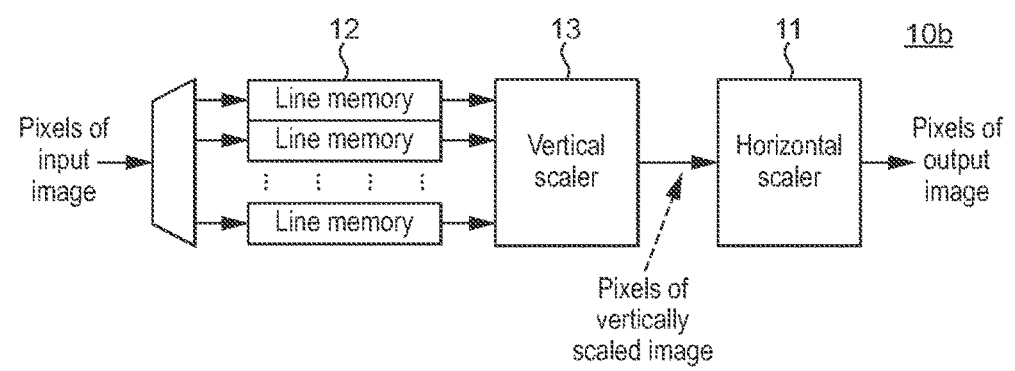

A first embodiment of the technology described herein comprises a method of scaling a data array comprising:

selectively performing first horizontal scaling on an input data array to scale the data array in the horizontal direction;

storing horizontal lines of data of the data array in one or more line memories, wherein the or each line memory is for storing a horizontal line of data for the data array;

reading stored data from the one or more line memories and performing vertical scaling on the read data to scale the data array in the vertical direction; and selectively performing second horizontal scaling on the vertically scaled data array to scale the data array in the horizontal direction; and outputting an output data array.

A second embodiment of the technology described herein comprises a scaling apparatus for scaling data arrays comprising:

a first horizontal scaling stage operable to scale a data array input to the scaling apparatus in the horizontal direction;

one or more line memories for storing horizontal lines for a data array, wherein the or each line memory is for storing a horizontal line of data for the data array;

a vertical scaling stage operable to read data stored in the one or more line memories and to scale the read data in the vertical direction; and a second horizontal scaling stage operable to scale a data array to be output by the scaling apparatus in the horizontal direction; and an output stage operable to output an output data array.

In the scaling apparatus of the technology described herein, an additional horizontal scaling stage is provided in the scaling apparatus. One of the two horizontal scaling stages may be provided before the vertical scaling stage, and the other of the two horizontal scaling stages may be provided after the vertical scaling stage. The two horizontal scaling stages may be implemented as two separate horizontal scaling hardware modules. Alternatively, a single horizontal scaling module may be provided and the first and second horizontal scaling stages may be implemented by the single horizontal scaling module performing first horizontal scaling, a vertical scaling module performing vertical scaling, then sending the vertically scaled data array back to the single horizontal scaling module to allow the single horizontal scaling module to perform second horizontal scaling. Each of the two horizontal scaling stages may be selectively activated or enabled to either upscale or downscale a data array, and may be selectively deactivated or disabled to allow the data array to pass without scaling. This arrangement enables the size of each line memory to be reduced, thereby reducing the overall area of the line (RAM) memories.

The Applicants have recognised that the area occupied by the line (RAM) memories is much bigger compared to the entire processing logic (e.g. the scaling stages) of a scaling apparatus. Thus, a reduction in RAM memory area as a result of providing an additional horizontal scaling stage outweighs an increase in area as a result of additional logic required for the additional horizontal scaling stage. The reduction in RAM memory area can also lead to a reduction in the power consumption of the scaling apparatus, particularly in a case where only one of the horizontal scaling stages is enabled. Even in cases where more than one of the horizontal scaling stages is enabled, there may still be a saving in the power consumption as a result of a reduction in RAM memory area consuming less power.

The first horizontal scaling stage may be enabled or disabled as desired. However, in an embodiment, the first horizontal scaling is in an embodiment performed (enabled) to downscale a data array in the horizontal direction when the horizontal size of the data array is larger than the size of the line memory(s).

The second horizontal scaling stage may be enabled or disabled as desired. However, in an embodiment, the second horizontal scaling is performed (enabled) to upscale a vertically scaled data array in the horizontal direction when the horizontal size of the data array to be output by the scaling apparatus is larger than the size of the line memory(s).

In an embodiment, the first horizontal scaling is omitted (disabled) when the horizontal size of the data array is smaller than or equal to the size of the line memory(s). In this case, the first horizontal scaling stage is bypassed.

In an embodiment, the second horizontal scaling is omitted (disabled) when the horizontal size of the data array to be output by the scaling apparatus is smaller than or equal to the size of the line memory(s). In this case, the second horizontal scaling stage is bypassed.

In an embodiment, when the horizontal size of the data array (e.g. horizontal resolution of an image) input to the scaling apparatus exceeds the size of the line memories, the input data array may be downscaled in the horizontal direction in the first horizontal scaling stage, such that the line memories can accommodate the downscaled data array.

The input data array is, in an embodiment, horizontally downscaled to the same size as the size of the line memories. However, the input data array may be horizontally downscaled to a size that is smaller than the size of the line memories if desired.

In an embodiment, when the horizontal size of the data array (e.g. horizontal resolution of an image) to be output by the scaling apparatus exceeds the size of the line memories, the data array output from the vertical scaling stage may be upscaled in the second horizontal scaling stage, such that the data array is only upscaled when the line memories are no longer required.

In an embodiment, when the horizontal size of the input data array is smaller than or equal to the size of the line memories, the first horizontal scaling stage may be omitted such that the input data array is allowed to bypass the first horizontal scaling stage without being scaled. Moreover, when the horizontal size of the data array to be output by the scaling apparatus is smaller than or equal to the size of the line memories, the second horizontal scaling stage may be omitted such that the input image data is allowed to bypass the second horizontal scaling stage without being scaled. It is therefore possible to reduce the overall power consumption in this case.

In some embodiments, both the first and the second horizontal scaling stages may be enabled (performed). For example, the downscaling (or upscaling) of a data array in the horizontal direction may be divided into two (or more) stages and each of the first and second horizontal scaling stages performs a portion of the downscaling (or upscaling). Alternatively, downscaling in the horizontal direction may be performed on the data array in the first horizontal scaling stage, for example to reduce the horizontal size of the input data array so as to be compatible with the size of the line memories, and then subsequently upscaling in the horizontal direction may be performed in the second horizontal scaling stage on the data array output from the vertical scaling stage to increase the horizontal size of the data array to be output by the scaling apparatus, e.g. to restore the data array to the original horizontal size.

In some embodiments, horizontal upscaling may be performed in the first horizontal scaling stage to increase the horizontal size of a data array provided that the horizontal size of the upscaled data array is less than or equal to the size of the line memories. Similarly, horizontal downscaling may be performed in the second horizontal scaling stage (instead of the first horizontal scaling stage) to reduce the horizontal size of a data array provided that the data array to be input to the vertical scaling stage has a horizontal size that is less than or equal to the size of the line memories.

Another embodiment of the technology described herein comprises a method of scaling a data array comprising:

performing first horizontal scaling on an input data array to scale the data array in the horizontal direction;

storing or writing the horizontally scaled data array in one or more line memories, wherein the or each line memory is for storing a horizontal line of data of the data array;

reading the data array from the one or more line memories and performing vertical scaling on the read data array to scale the data array in the vertical direction; and performing second horizontal scaling on the vertically scaled data array to scale the data array in the horizontal direction and outputting an output data array.

In an embodiment, when the horizontal size of the data array input to the scaling apparatus is larger compared to the size of the line memories, the first horizontal scaling to downscale the input data array is performed before the vertical scaling stage, such that the line memories are able to accommodate horizontal lines of data of the data array. When the horizontal size of the data array to be output by the scaling apparatus is larger compared to the size of the line memories, the second horizontal scaling is in an embodiment performed to upscale the horizontal size of the data array to be output by the scaling apparatus after the vertical scaling stage.

According to this embodiment, by first horizontally downscaling an input data array before the vertical scaling stage, and then horizontally upscaling the data array after the vertical scaling stage, it is possible to adjust the horizontal size of a data array as desired before the vertical scaling stage, thereby allowing the size of each line memory to be reduced to a size smaller than the maximum horizontal size supported by the scaling apparatus, even when both the input data array and the output data array have a larger horizontal size (e.g. higher number of pixels in the horizontal direction of an image) compared to the size of a line memory.

The line memories may be set to have any size as desired, but according to an embodiment, the size of each line memory is smaller than the maximum horizontal resolution supported by the scaling apparatus. In a further embodiment, the size of each line memory is set such that the (maximum) number of data positions the line memory is capable of storing corresponds to a fraction of the maximum number of data positions (e.g. sampling positions) in the horizontal direction that is supported by the scaling apparatus.

The Applicants have recognised in this regard that by reducing the number of data positions each line memory can store data for to a smaller fraction of the maximum supported number of horizontal data positions (sampling positions), the area of the line memories can be reduced further. However, the quality of the resulting scaled data array (e.g. the image quality of the resulting image) may be affected if the size of each line memory is too small. Thus, in an embodiment, the (maximum) number of data positions each line memory can store is set to be half of the maximum supported number of data positions in the horizontal direction.

Any suitable and desired number of line memories may be provided in the scaling apparatus. The number of line memories used will, and in an embodiment does, depend upon the vertical scaling method or methods that is or can be used by the scaling apparatus. Thus there are in an embodiment (at least) as memory line memories as the number of horizontal lines that could be required for input to a given iteration of the vertical scaling operation. Thus, for example, where the vertical scaling operation uses polyphase filtering, the scaling apparatus in an embodiment has at least as many line memories as the number of taps used by the polyphase filter (and in an embodiment has the number of line memories (and only the number of line memories) corresponding to the number of taps used by the polyphase filter. Thus, in an embodiment, there are six or eight line memories.

In an embodiment, more than two horizontal scaling stages are provided to a scaling apparatus according to the technology described herein. The additional horizontal scaling stages may be provided before or after the vertical scaling stage, and may be provided either as separate (hardware) horizontal scaling modules or implemented by passing a data array through the same single horizontal scaling module for horizontal scaling at each horizontal scaling stage. Further vertical scaling stages may also be provided if desired.

The horizontal and vertical scaling may be performed using any scaling methods as desired. The horizontal scaling method is not necessarily the same as the vertical scaling method, and the first horizontal scaling stage does not necessarily use the same scaling method as the second horizontal scaling stage. In an embodiment, at least one of, and in an embodiment both, of the vertical scaling and the horizontal scaling (and in an embodiment all the horizontal scaling stages) is performed using polyphase filtering. As discussed above, the number of line memories in the scaling apparatus in an embodiment corresponds to the number of taps used by the vertical scaling polyphase filter. (The horizontal scaling method does not influence the number of line memories.)

The technology described herein may be implemented in any desired and suitable hardware product that performs scaling such as image scaling, for example a display processor, a GPU or a video processor. In an embodiment, the technology described herein is implemented in a display processor. In a display processor, an image scaler may use a 6-tap polyphase filter, which requires six line memories, so as to achieve high-quality results. The technology described herein is therefore particularly advantageous in this case as area saving can be significant.

The technology described herein may be implemented in any desired and suitable data processing system that is operable to generate data arrays having a plurality of data positions, such as frames to be displayed.

The technology described herein should (and in some embodiments does) produce some useful output data, e.g. an array of output image data for use in displaying an image.

The data processing system that the technology described herein is implemented in may contain any desired, appropriate and suitable elements and components. Thus it may, and in an embodiment does, contain one or more of: a CPU, a GPU, a video processor (video engine/encoder-decoder), a composition engine, an image processor, a display controller, a camera ISP, and appropriate memory for storing the various data arrays (e.g. frames) and other data that is required.

The technology described herein may be implemented in any suitable system, such as a suitably configured microprocessor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements, stages, modules, etc. of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor, hence the various processing stages may be carried out on separate assigned processing circuitries. Equally, the various processing stages may share processing circuitry, etc., if desired.

The technology described herein is applicable to any suitable form or configuration of graphics/video processor and renderer, such as processors having a "pipelined" rendering arrangement (in which case the renderer will be in the form of a rendering pipeline). It is particularly applicable to tile-based graphics processors, graphics processing systems, video processors, video processing systems, composition engines and compositing display controllers.

In some embodiments, the apparatus comprises, and/or is in communication with, one or more memories and/or memory devices that store the data described herein, and/or store software for performing the processes described herein. The apparatus may also be in communication with a host microprocessor, and/or with a display for displaying images based on the data generated by the apparatus.

It will also be appreciated by those skilled in the art that all of the described embodiments of the technology described herein may include, as appropriate, any one or more or all of embodiments and features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Figure 2:
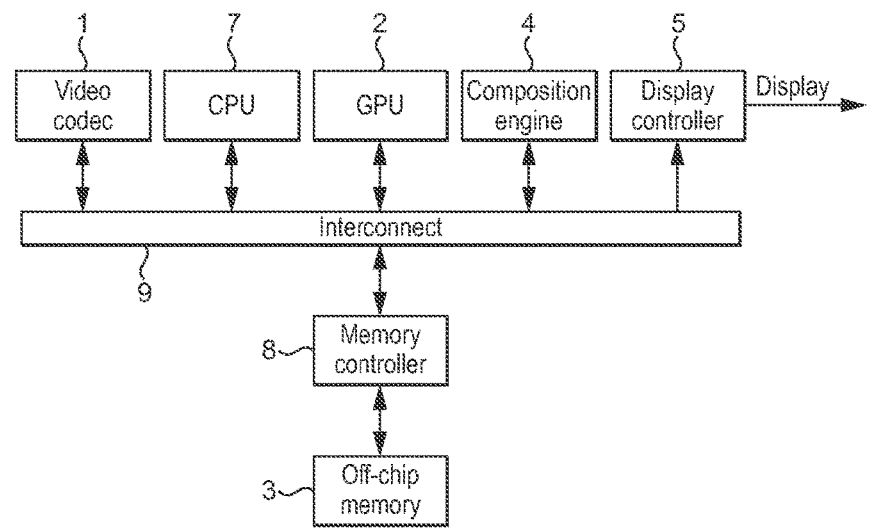
FIG. 2 shows an example of a data processing system.

According to embodiments of the technology described herein, a scaling apparatus such as an image scaler may be provided to a data processing system such as the exemplary data processing system shown in FIG. 2. The data processing system comprises a central processing unit (CPU) 7, graphics processing unit (GPU) 2, video codec 1, composition engine 4, display controller 5 and a memory controller 8. As shown in FIG. 2, these communicate via an interconnect 9 and have access to off-chip main memory 3. The composition engine 4 generates a composited output frame from one or more input surfaces (e.g. generated by the GPU 2 and/or video codec 1) and the composited output frame is then stored, via the memory controller 8, in a frame buffer in the off-chip memory 3. The display controller 5 then reads the composited output frame from the frame buffer in the off-chip memory 3 via the memory controller 8 and sends it to a display for display. In the embodiments, a scaling apparatus may be provided in one or more of the video codec 1, GPU 2, composition engine 4, display controller 5 and/or CPU 7, or as a separate module of the data processing system to be shared by one or more units of the data processing system.

Figure 3:
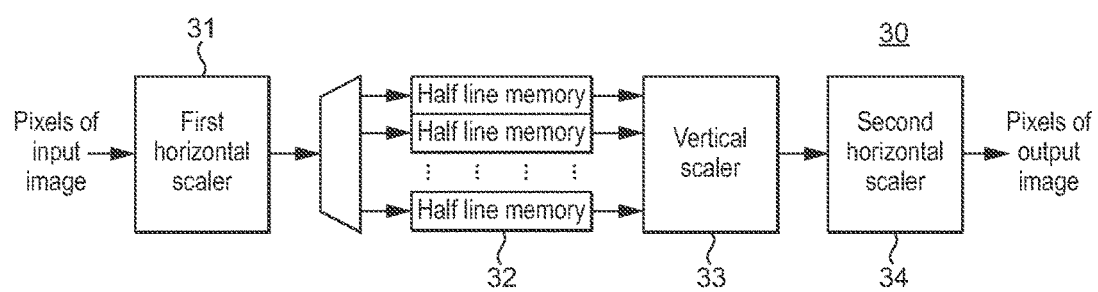
FIG. 3 shows a scaling apparatus according to an embodiment of the technology described herein.

FIG. 3 schematically shows a scaling apparatus 30 according to an embodiment of the technology described herein. The scaling apparatus 30 comprises a first horizontal scaler 31, a plurality of line memories 32, a vertical scaler 33 and a second horizontal scaler 34. Compared to the conventional scaling apparatus shown in FIG. 1, it can be seen that the scaling apparatus 30 differs at least by comprising an additional horizontal scaler.

According to the embodiment, a data array such as image data input to the scaling apparatus 30 may first be (up- or down-) scaled in the horizontal direction by the first horizontal scaler 31. The scaled data array is then written to the plural line memories 32, which are then read by the vertical scaler 33 and (up- or down-) scaled in the vertical direction. The vertically scaled image data is passed to the second horizontal scaler 34 which may (up- or down-) scale the data array before it is output by the scaling apparatus 30.

The number of line memories 32 provided to the scaling apparatus 30 is determined by the scaling method used in the vertical scaling stage. In embodiments where, for example, a 6-tap polyphase filter is used, six line memories are required.

In the present embodiment, each line memory 32 is able to store (data for) a number of data positions (data entries) corresponding to half the number of data positions (sampling points) in the horizontal direction of the maximum size of data array that is supported by (that can be processed by) the scaling apparatus (i.e. such that if the number of sampling points in the horizontal direction of the maximum size data array supported by the scaling apparatus is HS, each line memory will be capable of storing (data for) HS/2 sampling points).

In other words, the scaling apparatus of the technology described herein can support and scale data arrays (images) that are up to twice the horizontal size of the line memories 32. This is in contrast to conventional scaling apparatus, where each line memory stores a number of data entries corresponding to the number of data positions in the horizontal direction of the maximum size data array that the scaling apparatus supports. (For example, for a conventional image scaler that supports an image with a maximum resolution of 4096 pixels, each line memory of the image scaler is required to be able to store a number of data entries corresponding to 4096 pixels.)

As a result of having an additional horizontal scaling stage, it is possible to reduce the size of each of the plural line memories 32. A reduction in the size of each line memory is achieved by horizontal downscaling of an input data array by the first horizontal scaler 31 when the input data array has a horizontal size that exceeds the capacity of a line memory, and/or by horizontal upscaling of a data array to be output by the scaling apparatus 30 by the second horizontal scaler 34 when the output data array is to have a horizontal resolution that exceeds the capacity of a line memory. In doing so, it is possible to ensure that horizontal lines of data of the data array to be written to each line memory 32 have a size that is compatible with the size of each line memory 32. The Applicants have found in particular that a reduction of the size of each line memory by half, from being able to store a number of data entries corresponding to the maximum number of sampling points in the horizontal direction of the maximum size data array supported by the scaling apparatus (HS) to half of the maximum number of sampling points in the horizontal direction (HS/2), can be achieved without significantly affecting the image quality of the output image data (although other sizes of line memory could be used, if desired).

Figure 4:
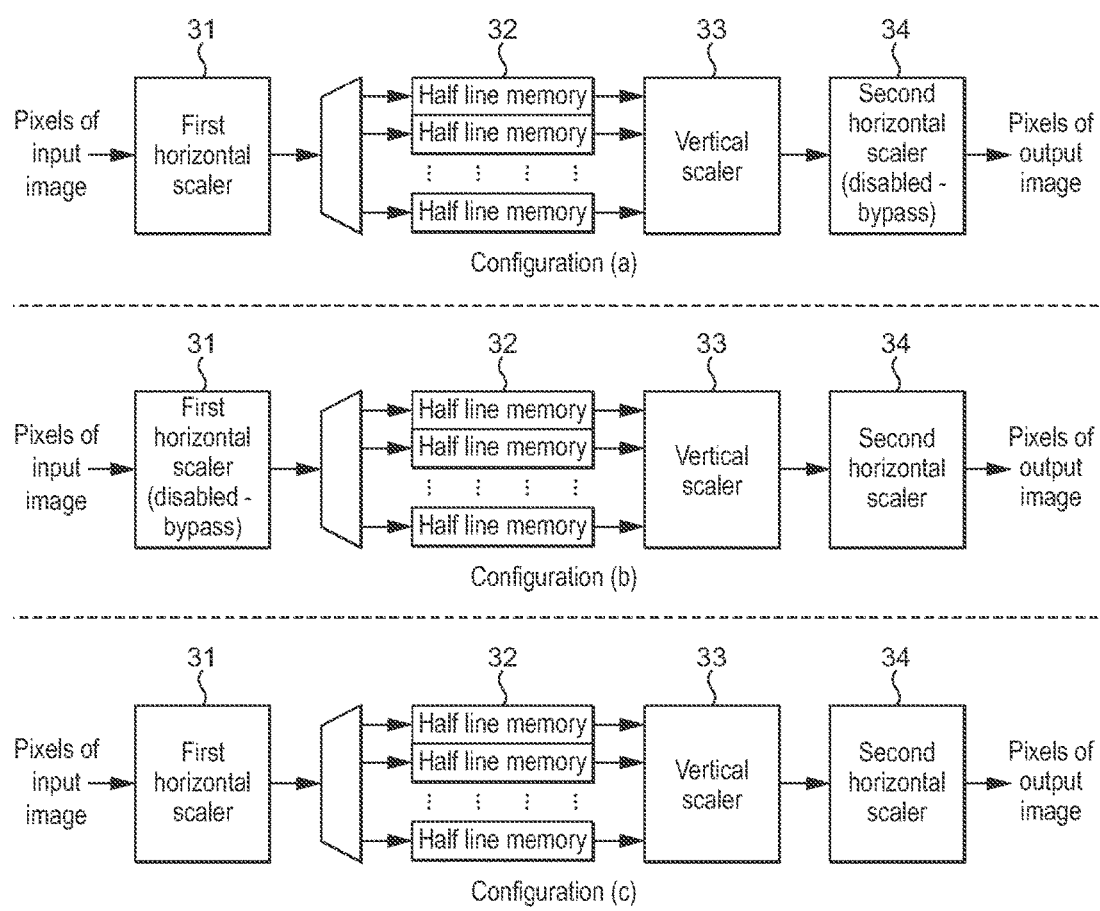
FIG. 4 shows three different operating configurations of the scaling apparatus of FIG. 3.

The first horizontal scaler 31 and the second horizontal scaler 34 of the scaling apparatus 30 can be independently enabled or disabled in different operating configurations. FIG. 4 shows the different operating configurations of the scaling apparatus 30. In configuration (a), the first horizontal scaler 31 of the scaling apparatus 30 is enabled (activated) such that a data array input to the scaling apparatus 30 is first horizontally scaled by the first horizontal scaler 31 before being written to the plural line memories 32. The vertical scaler 33 then reads each horizontal line of data of the data array from the plural line memories 32 and performs vertical scaling on the read data. In this configuration, the second horizontal scaler 34 is disabled (deactivated) and so the vertically scaled data array bypasses the second horizontal scaler 34 and is output by the scaling apparatus 30. This configuration is particularly suitable in cases where the input data array has a horizontal size that is larger than HS/2 (i.e. the capacity of the line memories 32), but the horizontal size of the data array to be output by the scaling apparatus 30 is smaller than or equal to HS/2, in which case the input data array is first downscaled to the desired horizontal size before being written to the plural line memories 32.

In configuration (b), the first horizontal scaler 31 of the scaling apparatus 30 is disabled (deactivated) such that a data array input to the scaling apparatus 30 bypasses the first horizontal scaler 31 and is written to the plural line memories 32 without being scaled. The vertical scaler 33 then reads horizontal lines of the data array from the plural line memories 32 and performs vertical scaling on the read data. In this configuration, the second horizontal scaler 34 is enabled (activated) and so the vertically scaled data array is horizontally scaled by the second horizontal scaler 34 before being output by the scaling apparatus 30. This configuration is particularly suitable in cases where the input data array has a horizontal size that is smaller than or equal to HS/2 (the capacity of the line memories 32), but the horizontal size of the data array to be output by the scaling apparatus 30 is larger than HS/2, in which case the data array to be output is only upscaled to the desired resolution after the vertical scaling stage is complete.

In configuration (c), both the first horizontal scaler 31 and the second horizontal scaler 34 of the scaling apparatus 30 are enabled (activated). A data array input to the scaling apparatus 30 is first scaled by the first horizontal scaler 31 before written to the plural line memories 32. The vertical scaler 33 then reads the data from the plural line memories 32 and performs vertical scaling on the read data. The vertically scaled data array is then scaled by the second horizontal scaler 34 before being output by the scaling apparatus 30. This configuration is particularly suitable in cases where the input data array has a horizontal size that exceeds HS/2 (the capacity of the line memories 32), and the horizontal size of the data array to be output by the scaling apparatus 30 is also greater than HS/2, in which case the horizontal size of the input data array is first downscaled to HS/2 (or less) by the first horizontal scaler 31, and then the horizontal size of the data array is upscaled again to the desired resolution after vertical scaling before being output.

As a result of the data array being first horizontally downscaled and then upscaled, there may be a slight drop in the quality of the resultant data. However, this configuration is only used in very specific cases when scaling from high horizontal resolution to high horizontal resolution, and any drop in quality has been found to be acceptable in practice.

The different configurations may be selected for use depending on the type of scaling to be performed and the input and output resolutions required by the scaling operation. Five exemplary cases are described below.

In the first exemplary case, a data array input to the scaling apparatus 30 is to be downscaled in the horizontal direction to an output horizontal size that is smaller than or equal to HS/2 from an input horizontal size that is also smaller than or equal to HS/2. In this case, the downscaling can be performed either by the first horizontal scaler 31 or the second horizontal scaler 34, i.e. either configuration (a) or configuration (b). However, when configuration (a) is used, the data array is downscaled first and so less data needs to be processed by the vertical scaler, therefore the overall power consumption by the scaling apparatus 30 is reduced.

In the second exemplary case, a data array input to the scaling apparatus 30 is to be upscaled in the horizontal direction from an input horizontal size that is smaller than or equal to HS/2 to an output horizontal size that is again smaller than or equal to HS/2. In this case, the upscaling can be performed either by the first horizontal scaler 31 or the second horizontal scaler 34, i.e. either configuration (a) or configuration (b). However, when configuration (b) is used, less data needs to be processed by the vertical scaler before the data array is upscaled, and so the overall power consumption by the scaling apparatus 30 is reduced.

In the third exemplary case, a data array input to the scaling apparatus 30 is to be upscaled in the horizontal direction from an input horizontal size that is smaller than or equal to HS/2 to an output horizontal size that is larger than HS/2. In this case, configuration (b) is used so that the upscaling is performed after the vertical scaling stage, in which case the plural line memories 32 have sufficient capacity to store each horizontal line of data of the data array to be vertically scaled.

In the fourth exemplary case, a data array input to the scaling apparatus 30 is to be downscaled in the horizontal direction from an input horizontal size that is larger than HS/2 to an output horizontal size that is smaller than or equal to HS/2. In this case, configuration (a) is used so that the downscaling is performed before the vertical scaling stage, in which case the plural line memories 32 have sufficient capacity to store each horizontal line of data of the data array to be vertically scaled.

In the fifth exemplary case, a data array input to the scaling apparatus 30 is to be either upscaled or downscaled in the horizontal direction from an input horizontal size that is larger than HS/2 to an output horizontal size that is also larger than HS/2. In this case, configuration (c) is used in which both the first and second horizontal scalers 31, 34 are enabled. The first horizontal scaler 31 first horizontally downscale each line of the data array to a horizontal size equal to (or smaller than) HS/2. It is then possible for each line of the data array to be stored in the plural line memories 32 and for the vertical scaler 33 to perform vertical scaling. The vertically scaled image data is then horizontally upscaled by the second horizontal scaler 34 to the desired horizontal size, which may or may not be the same horizontal size as the input data array.

As can be seen in the examples described above, the modified scaling apparatus and method according to the technology described herein enable each line memory to be reduced in size. It is therefore possible to reduce the overall area and power consumption of the scaling apparatus.

The five exemplary cases are summarised in Table 1 below:

TABLE 1

| Case ID | Input resolution | Output resolution | Horizontal scaling type | Number of enabled horizontal scalers | Configuration used |
|---|---|---|---|---|---|
| 1 | ≤HS/2 | ≤HS/2 | down-scaling | 1 | (a) |
| 2 | ≤HS/2 | ≤HS/2 | up-scaling | 1 | (b) |
| 3 | ≤HS/2 | >HS/2 | up-scaling | 1 | (b) |
| 4 | >HS/2 | ≤HS/2 | down-scaling | 1 | (a) |
| 5 | >HS/2 | >HS/2 | any | 2 | (c) |

According to embodiments of the technology described herein, the scaling apparatus 30 can be provided to or integrated in one or more units of a data processing system such as the data processing system shown in FIG. 2. For example, the scaling apparatus 30 may be provided in the video codec 1, the GPU 2, the composition engine 4, the display controller 5 and/or the CPU 7, or one (or more) scaling apparatus may be provided to the data processing system to be shared by one or more processing units.

Figure 5:
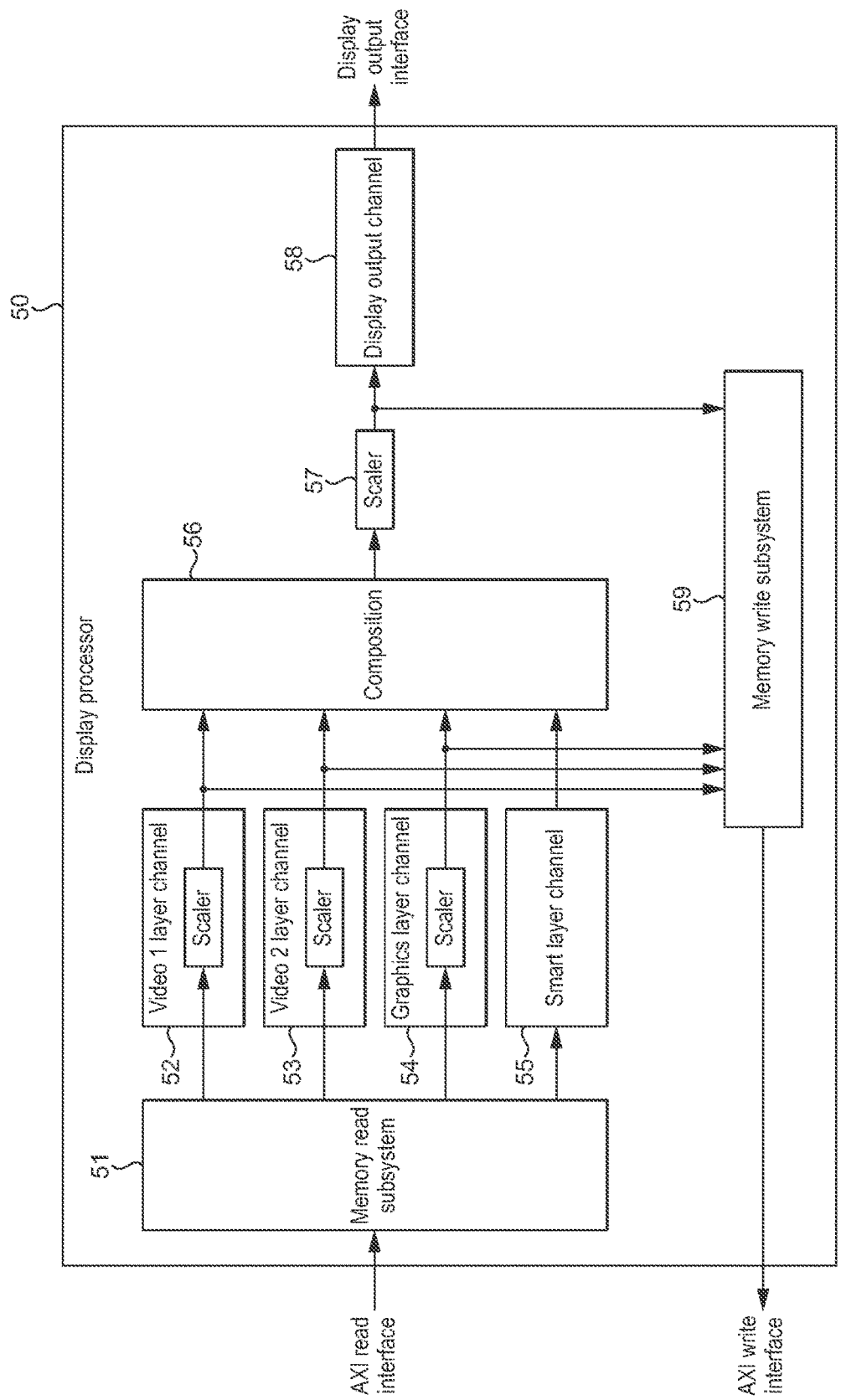
FIG. 5 shows schematically a display processor in accordance with an embodiment of the technology described herein.

FIG. 5 shows an embodiment in which plural scaling apparatus are provided in a display processor 50.

The display processor 50 comprises a memory read subsystem 51, which reads image data via an AXI read interface and outputs video 1 layer channel data to a first processing unit 52, video 2 layer channel data to a second processing unit 53, graphics layer channel data to a third processing unit 54 and smart layer channel data to a processing unit 55 to be processed. In the embodiment, each of the processing units 52, 53 and 54 is provided with an image scaler in the form of the scaling apparatus 30 described above. It should be noted, however, that it is not essential for each of the units 52, 53 and 54 to have a separate image scaler. Data input to the units 52, 53 and 54 is processed by the respective units and, where appropriate, scaled by the respective image scalers as described above.

After the video 1 layer channel data, video 2 layer channel data, graphics layer channel data and smart layer channel data have been processed by the respective units 52, 53, 54 and 55, the processed data is sent to a composition unit 56 to be composited, and to a memory write subsystem 59 to be written, via an AXI write interface, to external memory. The composited data is output by the composition unit 56 to an image scaler 57, e.g. in the form of the scaling apparatus 30 described above, to be scaled if appropriate. The image data output by the image scaler 57 is written to the external memory by the memory write subsystem 59 via the AXI write interface, and is sent to a display output channel 58 to be output for display via a display output interface.

It should be noted that plural image scalers are shown in FIG. 5 to illustrate possible locations at which an image scaler may be provided in a display processor. However, it will be understood that it is not essential to provide an image scaler to each or more than one of the units of the display processor. For example a common image scaler may be provided that can be shared by one or more units in the display processor.

According to the embodiments, modifying the architecture of a scaling apparatus by providing an additional horizontal scaler (or an additional horizontal scaling stage) allows the one or more line memories of the scaling apparatus to be reduced in size. The area reduction as a result of reducing the size of the one or more line memories generally outweighs the increase in size as a result of providing additional processing logic required by the additional horizontal scaling stage. It is therefore possible to achieve an overall reduction in the area of the image scaler. Since less data is expected to be processed by the vertical scaler of the scaling apparatus, it is also possible to reduce the overall power consumption of the scaling apparatus.

An example of area reduction is illustrated in Table 2 below, which shows an estimated comparison between an image scaler having a conventional architecture (single horizontal scaling stage) and an image scaler having an architecture according to the embodiments. The example is based on implementation results of an ARM MALI-DP550 display processor, with a maximum horizontal resolution (maximum image size in the horizontal direction) of 4096 pixels, and assuming the use of six line memories in each image scaler.

TABLE 2

| Component | Area for standard architecture [μm$^2$] | Area for the modified architecture (presented in this patent application) [μm$^2$] |
|---|---|---|
| single scaling filter | 13022 | 13022 |
| whole image scaler | 34017 | ~50000 (34017 + 13022 + extra logic to control the configurations) |
| line memories | 206514 (6 × 34419) | 115248 (6 × 19208) |
| TOTAL | 253553 | 178270 |

It can be seen from Table 2 that, according to the embodiments of the technology described herein at least, the total area of an image scaler may be reduced by about 30% compared to the conventional architecture.

As a consequence of a reduction in the area of the line memories, power consumption by the image scaler may also be reduced (since less power is consumed by the line memories). In particular, power consumption can be reduced significantly when an image scaler according to the technology described herein functions in configurations (a) or (b) of FIG. 4, as the same amount of power is consumed by the same amount of logic (single horizontal scaling stage and single vertical scaling stage) as in conventional architectures, but the overall area of the RAM (line) memories is reduced by half. For configuration (c), part of the reduction in the power consumed by the line memories will be counterbalanced by the power required for the additional horizontal scaling stage.

As will be appreciated from the above, the technology described herein, in an embodiment, is capable of providing an architecture for reducing the size of line memories (RAM memories) required in an image scaler when scaling image data, e.g. to provide it for display, compared to known, conventional image scaler architectures. It is therefore possible to reduce overall area of an image scaler and power consumption e.g. when processing image or video content.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of scaling a data array using a scaling apparatus that comprises one or more line memories, wherein the or each line memory is for storing a horizontal line of data for a data array, the method comprising:
  determining whether a horizontal size of an input data array is larger than the size of a line memory of the one or more line memories;
  performing a first horizontal scaling to downscale the input data array in the horizontal direction when it is determined that the horizontal size of the input data array is larger than the size of a line memory of the one or more line memories, thereby forming a horizontally scaled data array;
  storing horizontal lines of data for the horizontally scaled data array in the one or more line memories;
  reading stored data corresponding to the horizontally scaled data array from the one or more line memories and performing vertical scaling on the read data to scale the horizontally scaled data array in the vertical direction to form a vertically scaled data array; and
  selectively performing second horizontal scaling on the vertically scaled data array to scale the vertically scaled data array in the horizontal direction to form an output data array; and
  outputting the output data array.

2. A method according to claim 1, comprising
  performing the second horizontal scaling to upscale the vertically scaled data array in the horizontal direction when the horizontal size of the data array to be output is larger than the size of a line memory.

3. A method according to claim 1, comprising
  omitting the first horizontal scaling when the horizontal size of the input data array is smaller than or equal to the size of a line memory.

4. A method according to claim 1, comprising
  omitting the second horizontal scaling when the horizontal size of the data array to be output is smaller than or equal to the size of a line memory.

5. A method according to claim 1, comprising:
  performing first horizontal scaling on an input data array to scale the data array in the horizontal direction;
  storing horizontal lines of the horizontally scaled data array in one or more line memories, wherein the or each line memory is for storing a horizontal line of data for the data array;
  reading data from the one or more line memories and performing vertical scaling on the read data to scale the data array in the vertical direction; and
  performing second horizontal scaling on the vertically scaled data array to scale the data array in the horizontal direction; and outputting an output data array.

6. A method according to claim 5, further comprising at least one of:
  when the horizontal size of the input data array is larger than the size of a line memory, performing the first horizontal scaling to downscale the input data array in the horizontal direction; and
  when the horizontal size of the output data array is larger than the size of a line memory, performing the second horizontal scaling to upscale the output data array in the horizontal direction.

7. A method according to claim 1, wherein the each line memory is capable of storing data entries for a number of data positions that corresponds to a fraction of the maximum number of data positions in the horizontal direction that can be handled by the first and second horizontal scaling.

8. A method according to claim 7, wherein the fraction is half.

9. A method according to claim 1, wherein the data array is an image.

10. A scaling apparatus for scaling data arrays comprising:
  first horizontal scaling stage circuitry operable to scale a data array input to the scaling apparatus in the horizontal direction;
  one or more line memories for storing horizontal lines for a data array received from the first horizontal scaling stage circuitry, wherein the or each line memory is for storing a horizontal line of data for the data array;
  vertical scaling stage circuitry operable to read data stored in the one or more line memories and to scale the read data in the vertical direction; and
  second horizontal scaling stage circuitry operable to scale in the horizontal direction a data array received from the vertical scaling stage circuitry;
  wherein the scaling apparatus comprises determination circuitry operable to determine whether the horizontal size of the input data array is larger than the size of a line memory, and wherein the first horizontal scaling stage circuitry is operable to downscale the input data array in the horizontal direction when it is determined that the horizontal size of the input data array is larger than the size of a line memory.

11. A scaling apparatus according to claim 10, wherein the second horizontal scaling stage circuitry is operable to upscale the vertically scaled data array in the horizontal direction when the horizontal size of the data array to be output is larger than the size of a line memory.

12. A scaling apparatus according to claim 10, wherein the first horizontal scaling stage circuitry is operable to pass an input data array without scaling when the horizontal size of the input data array is smaller than or equal to the size of a line memory.

13. A scaling apparatus according to claim 10, wherein the second horizontal scaling stage circuitry is operable to pass the vertically scaled data array without scaling when the horizontal size of the data array to be output is smaller than or equal to the size of a line memory.

14. A scaling apparatus according to claim 10, wherein each line memory is capable of storing data entries for a number of data positions that corresponds to a fraction of the maximum number of data positions in the horizontal direction that can be handled by the first horizontal scaling stage circuitry and the second horizontal scaling stage circuitry.

15. A scaling apparatus according to claim 14, wherein the fraction is half.

16. A scaling apparatus according to claim 10, wherein the data array is an image.

17. A scaling apparatus according to claim 10, further comprising one or more further horizontal and/or vertical scaling stage circuitries operable to scale a data array before outputting an output data array.

18. A scaling apparatus according to claim 10, wherein the vertical scaling is performed by polyphase filtering, and wherein the number of line memories corresponds to the number of taps used by the polyphase filter.

19. A non-transitory computer readable storage medium storing computer software code which when executing on a processor performs a method of scaling a data array using a scaling apparatus that comprises one or more line memories, wherein the or each line memory is for storing a horizontal line of data for a data array comprising:

determining whether a horizontal size of an input data array is larger than the size of a line memory of the one or more line memories;

performing a first horizontal scaling to downscale the input data array in the horizontal direction when it is determined that the horizontal size of the input data array is larger than the size of a line memory of the one or more line memories, thereby forming a horizontally scaled data array;

storing horizontal lines of data for the horizontally scaled data array in the one or more line memories;

reading stored data corresponding to the horizontally scaled data array from the one or more line memories and performing vertical scaling on the read data to scale the horizontally scaled data array in the vertical direction to form a vertically scaled data array; and selectively performing second horizontal scaling on the vertically scaled data array to scale the vertically scaled data array in the horizontal direction to form an output data array; and outputting the output data array.

* * * * *